United States Patent [19]

Ersoy

[11] Patent Number: 4,508,327

[45] Date of Patent: Apr. 2, 1985

[54] SWING CLAMP

[75] Inventor: Metin Ersoy, Hilchenbach, Fed. Rep. of Germany

[73] Assignee: Maschinenfabrik HILMA GmbH, Hilchenbach, Fed. Rep. of Germany

[21] Appl. No.: 456,477

[22] Filed: Jan. 7, 1983

[30] Foreign Application Priority Data

Jan. 15, 1982 [DE] Fed. Rep. of Germany ....... 3201013

[51] Int. Cl.³ ............................................. B23Q 3/08
[52] U.S. Cl. ...................................... 269/23; 269/27; 269/32; 269/91; 92/33
[58] Field of Search ....................... 269/24, 27, 32, 91, 269/93, 23; 92/33, 5 R

[56] References Cited

U.S. PATENT DOCUMENTS

| | | | |
|---|---|---|---|
| 3,541,925 | 11/1970 | Guinot | 92/5 R |
| 3,572,216 | 3/1971 | Seesody | 269/32 X |
| 3,648,568 | 3/1972 | Wright | 92/5 R |
| 3,948,502 | 4/1976 | Waller et al. | 269/27 |
| 4,140,045 | 2/1979 | Hardwick et al. | 92/5 R |
| 4,351,516 | 9/1982 | Ersoy et al. | 269/27 |
| 4,413,549 | 11/1983 | Knable | 92/5 R |
| 4,417,236 | 11/1983 | Hung | 92/5 R X |

FOREIGN PATENT DOCUMENTS

| | | | |
|---|---|---|---|
| 320364 | 3/1972 | U.S.S.R. | 269/32 |

*Primary Examiner*—Frederick R. Schmidt
*Assistant Examiner*—Steven P. Schad
*Attorney, Agent, or Firm*—Martin A. Farber

[57] ABSTRACT

A hydraulically actuatable swing clamp, particularly for the clamping of objects on the table of a machine tool, includes a housing with a piston arranged therein, the latter having a piston rod extending in sealed manner out of the housing. The piston rod carries a clamping arm which in addition to a pure axial clamping motion, performs a swinging motion, effected by a guide device. The guide device includes a normally non-rotatable control bolt arranged on the housing extending into the piston, and at least one cam groove developed in a guide surface between the control bolt and the piston. The cam groove has a helical groove section for the swinging and simultaneous lifting motion, and an axial section for the pure axially directed clamping motion of the clamping arm. A guide member, preferably a ball, arranged on the piston or control bolt, extends into the cam groove. In order to avoid interference with the movement of the object, the clamping arm is swingable from an intermediate position located above the clamping plane rotated at a predetermined angle from the clamping position, into a position of rest which lies below the clamping plane rotated relative to the clamping position by an angle that is twice the angle of rotation of the intermediate position from the clamping position.

14 Claims, 7 Drawing Figures

SWING CLAMP

The present invention relates to clamps and more specifically to a hydraulically actuatable swing clamps, particularly for the clamping of workpieces, tools and fixtures onto the table of a machine tool, the swing clamp having a piston arranged in a housing, the piston rod of which extends in sealed manner out of the housing and carries a clamping arm, the piston rod carrying out, in addition to an axial clamping movement, a rotary movement, corresponding to a guide device, which effects a swinging of the clamping arm. The guide device includes a control bolt which is arranged normally non-rotatably on the housing and which extends into the piston, and at least one cam groove formed in a guide surface between the control bolt and the piston. The cam groove includes a helical curve section for swinging and simultaneous lifting movement, and an axial section for pure clamping movement of the clamping arm and a guide member arranged on the piston or control bolt extends into the cam groove.

Swing clamps which are hydraulically actuatable in two operating directions (double-acting) or are single-acting with a spring return are known in the art. Swing clamps can replace other known devices such as toggle levers, clamping bars and clamping claws on jigs and machines since their hydraulically actuated clamping arm is capable of compound movement. Thus the swing clamping arm not only carries out a reliable clamping movement but is swung automatically through 90° in a plane perpendicular to the direction of clamping, into the clamping space or out of it. Consequently, the insertion and removal of a workpiece is considerably simplified. In order to prevent damage to the workpiece and to the swing clamp in the event that a wrong workpiece is used or the correct workpiece is improperly inserted, the bolt which controls the swinging and clamping motion of the clamping arm can be fastened on the housing of the swing clamp by an overload safety which, in case of a blocked swinging process, releases the control bolt that is normally arranged in non-rotatable fashion on the housing so that it can turn with respect to the housing, thereby avoiding damage.

In one known swing clamp as shown in U.S. Pat. No. 3,572,216, a ball which serves as a guide member is rotatably supported on the piston and engages a control cam groove on the cylindrical surface of the control bolt. In this device, the piston and the clamping arm fastened to the piston carry out a reciprocating lift-swivel motion in which the ball, which serves as a guide member, follows the guide path in opposite directions upon the inward and outward travel of the piston. The clamping arm has two end positions, namely an extended release position for the insertion and removal of the workpiece and a retracted position, which is 90° apart from the release position and serves as the clamping position. In this known type of swing movement the workpiece is lowered into the clamping location when the clamping arm, which swings away by 90°, is in the release position and does not form an obstacle for the workpiece which is to be inserted.

In some instances due to the size or shape of the workpiece or of special transport devices it may be necessary to push the workpiece laterally into the clamping position. For example lateral insertion may be required if the workpiece is heavy, or if there are special clamping locations on the workpiece, or because a restricted height of the work space does not permit lowering of the workpiece from a raised position. During lateral insertion of the workpiece into the operating position, the clamping arm, which extends out of the clamping surface and is swung 90° out of the clamping position, can be an undesirable obstacle.

The object of the invention therefore is to develop a swing clamp of the afore-mentioned type in such a way that the clamping arm, when in a rest position, does not interfere with the insertion of the workpiece.

In accordance with the invention the clamping arm (10) is swingable from an intermediate position (Z) above the clamping plane (E) (the clamping plane meaning the resting or support surface of the workpiece), the intermediate position (Z) being rotated by a predetermined angle from the clamping position (S), into a rest position (R) which lies below the clamping plane (E), the rest position (R) being rotated with respect to the clamping position (S) through twice said angle.

In accordance with the invention the clamping arm of the hydraulically actuatable swing clamp is swung automatically out of the clamping position through an intermediate position above the clamping plane, into a position of rest below the clamping plane so that it frees the work space for lateral placement of the workpiece into its clamping position. The clamping arm can also be used as a stop which can be swung away when the workpiece is to be machined or worked at the clamping location.

The swing clamp, in accordance with the invention, thus avoids any interference with movement of the workpiece by the clamping arm of the swing clamp. The clamping position per se of the clamping arm corresponds to the clamping position of known constructions. However, upon outward movement of the piston the clamping arm swings through a predetermined angle, such as 45° or 90°, into the intermediate position located above the clamping plane. From this position, the clamping arm, following inward movement of the piston, swings, for example, an additional 45° or 90° into a rest position below the clamping plane. In order to achieve this course of movement of the clamping arm, in accordance with another feature of the invention, an axially extending additional section (9d) for the intermediate position (Z) when the clamping arm (10) is lifted is developed between every two axial sections (9a) of the cam groove (9) which effects an axial clamping movement, said additional section being connected by helical cam sections (9b and 9c) respectively to the two axial sections (9a) in the manner that the upper end of one axial section (9a) thereby opens into the central region of the additional section (9d) and the lower end of the additional section (9d) thereby extends into the upper region of the other axial section (9a).

In accordance with this feature of the invention entrances that are necessarily present in the vicinity of the continuous cam groove which is closed on itself, are by-passed by the guide member, preferably a ball, without disturbing the operation when the piston carries out a purely axial movement since the directional momentum of the previously linearly guided piston is sufficient to keep the guide member from undesirably entering into a helical cam section. The desired turning movement of the piston with respect to the control bolt takes place respectively at the end of a purely axial movement, wherein the axial sections and axially extending additional sections of the cam groove pass, in the direction of movement of the guide member, in positive fashion into helical groove sections. In this way assurance is had, without any additional forced guiding measures, that the clamping arm will be swung in the desired direction of rotation between the three positions.

In a one-sided clamping arm, the axial sections (9a) of the control cam are 180° apart in the circumferential direction and the axial additional sections (9d) are arranged 90° from the axial sections (9a) in the circumferential direction. In a swing clamp with a double-sided (a two side) clamping arm, four axial sections (9a) are arranged 90° apart in the circumferential direction between which, additional sections (9d) are arranged 45° apart in the circumferential direction.

In order to avoid one-sided loads on the guide means, two or more guide members (balls 8) which are diametrically opposite each other can be arranged between the control bolt (13) and the piston (1). Despite this double or a quadruple arrangement no change in the cam groove is necessary.

Since the three different positions (R, S, Z) of the piston (20) and thus of the clamping arm are always in proper sequence corresponding to the predetermined movement of the piston, the piston positions (R, S, Z) can be sensed as a function of pressure or route path or position of the clamp or piston.

The cam grooves can be arranged either in the cylindrical surface of the control bolt or in the surface of the bore of the piston, the guide member then being arranged on the piston or on the control bolt respectively. One embodiment which is particularly simple to manufacture is obtained if the cam grooves are formed as grooves in the control bolt and if the guide members are formed as balls rotatably supported in a cage ring on the piston.

With the above and other objects and advantages in view, the present invention will become more clearly understood in connection with the detailed description of several embodiments, when considered with the accompanying drawings, of which:

Figure 1:
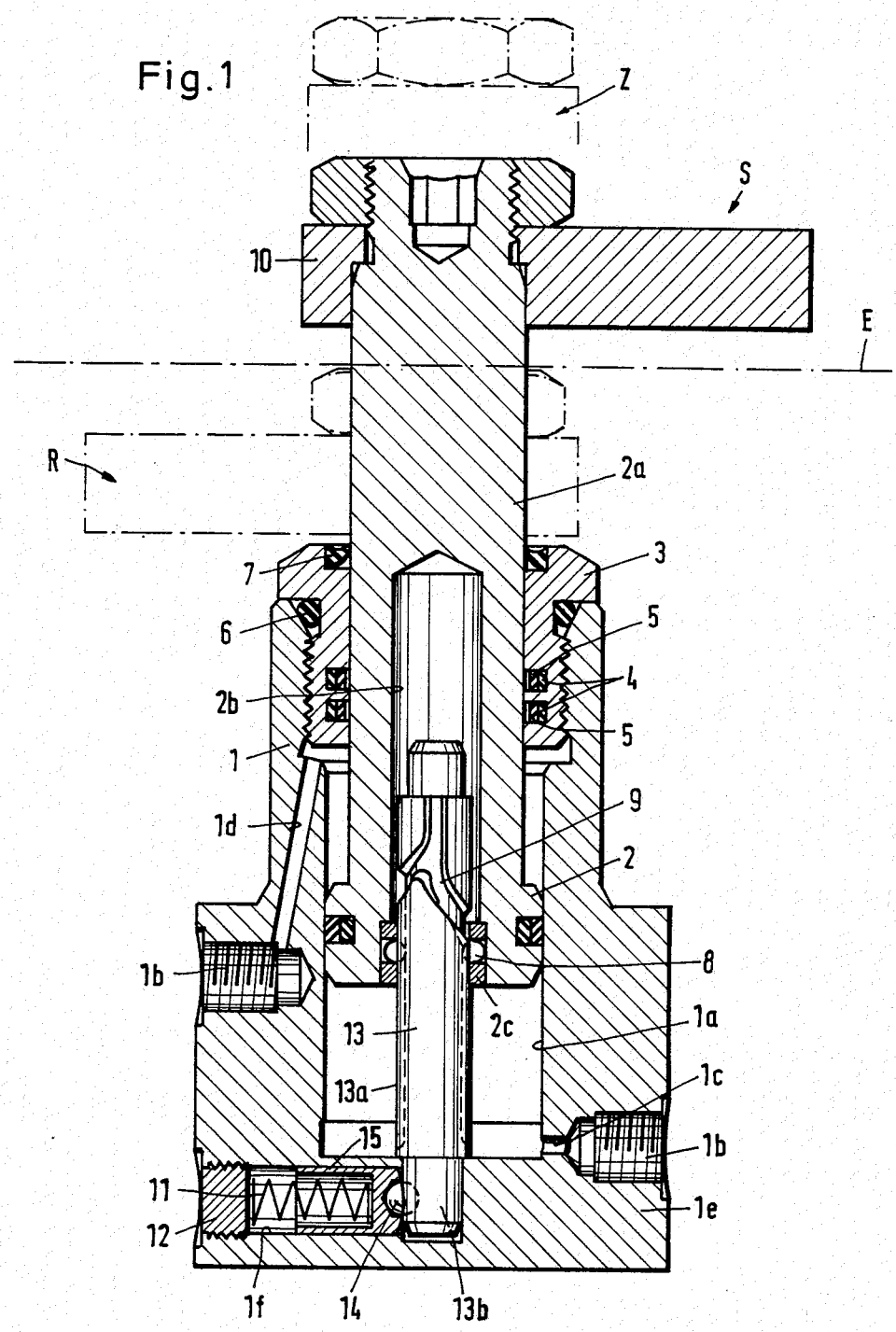
FIG. 1 is a longitudinal section of a swing clamp with a unilateral clamping arm, incorporating one embodiment of the invention.

The swing clamp shown in FIG. 1, which can be double-acting, has a housing 1 which is provided with a cylindrical bore 1a for a piston 2. A piston rod 2a of the piston 2 is extended out of the housing 1 and guided in sealed manner in a housing cover 3 which is screwed into the upper end of the housing 1. Both the piston 2 and the housing cover 3 are provided, for purposes of sealing, with sealing rings 4 which are assisted in their sealing action by O-rings 5 placed under them. An O-ring 6 is also provided for sealing between the housing cover 3 and the housing 1. Finally, the housing cover 3 has a scraper ring 7 which cooperates with the piston rod 2a.

Within the housing 1 there are provided two pressure fluid connections 1b one of which is connected via a port 1c with the bottom of the cylindrical bore 1a so that pressure fluid fed through this pressure-fluid connection 1b passes against the bottom of the piston 2. The other pressure fluid connection 1b is connected via a port 1d with the upper part of the housing 1 so that pressure fluid can be conducted by the port 1d to the piston rod-side surface of the piston 2 in order to effect the clamping movement.

A control bolt 13 extending into a central bore 2b in the piston 2 has a cylindrical wall surface 13a and, at its lower end, a cylindrical stop pin 13b by which it is placed in the bottom 1e of the housing 1. In the normal case, the control bolt 13 is non-rotatably held in the bottom 1e of the housing 1 by two locking elements 14 which engage in a detent depression 13c (see FIG. 4) in the stop pin 13b of the control bolt 13. The locking elements 14 are pressed via pressure pieces 15 by locking springs 11 against the control bolt 13, the pressure pieces 15 being arranged together with the locking elements 14 and the locking springs 11 in a transverse bore 1f in the bottom 1e of the housing 1. For the sake of better clarity only half of the transverse bore 1f is shown, turned 90°, in FIG. 1. It is closed by a plug 12 which is wedged in a pressure tight manner to prevent the emergence of pressure fluid after the assembling of the parts 12, 14, 15. The pressing force of the locking springs 11 is so designed that in the normal case the control bolt 13 is non-rotatably held in the housing 1 but that turning of the control bolt 13 with respect to the housing 1 can take place when the forces exerted on the control bolt 13 in the circumferential direction reach a value which could result in damage to the control bolt 13 or to the parts cooperating with it.

A cage ring 2c is non-rotatably fastened to the piston 2 in the central bore 2b of the piston 2. Two balls 8 are rotatably mounted within the cage ring 2c, the two balls being located at the same height opposite each other on a common diameter. These balls 8 respectively engage cam grooves 9 developed on the cylindrical surface 13a of the control bolt 13. The cam grooves 9 and the balls 8, which may be considered guide members, together with the control bolt 13, form a guide device for the piston 2, which causes the piston 2 to turn during part of its stroke. This controlled turning motion of the piston 2 is utilized to swing a clamping arm 10 fastened on the end of the piston rod 2a, which arm serves, for instance, to clamp workpieces onto the table of a machine tool or press.

Figure 2:
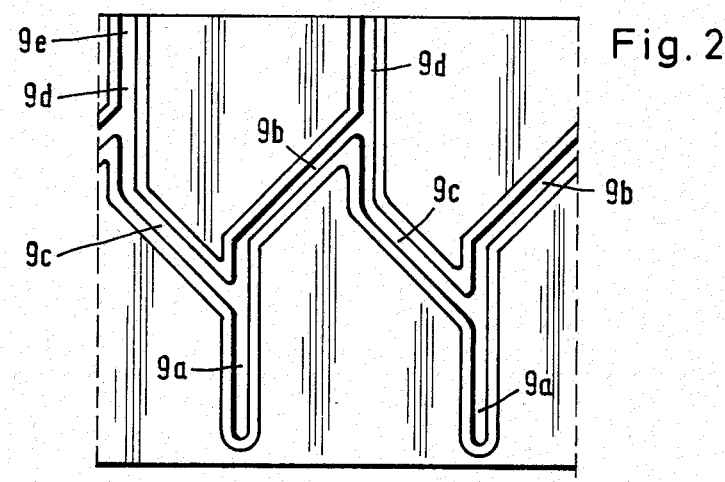
FIG. 2 is a development of the cylindrical surface of the control bolt thereof.
Figure 3:
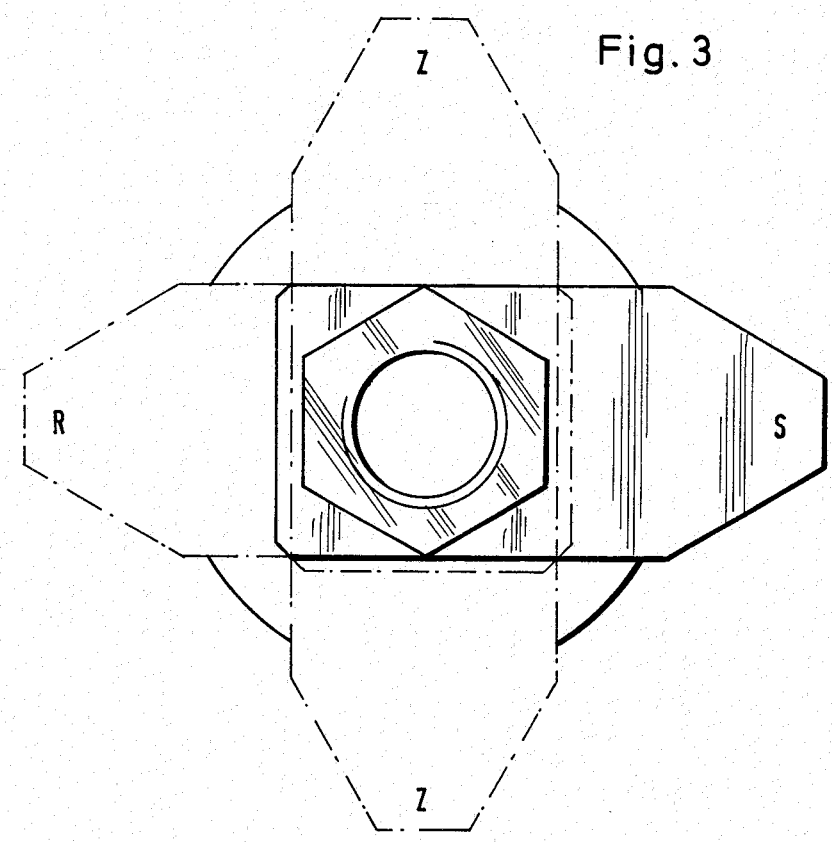
FIG. 3 is a top view of the clamping arm thereof in three different swing positions.

In the embodiment of FIGS. 1 to 3, the piston 2 carries a one-side clamping arm 10 having a clamping position S, shown in solid lines in FIGS. 1 and 3, for clamping thereunder a workpiece (not shown), the clamping arm 10 being shown in FIG. 1 however prior to the start of its final clamping stroke wherein the clamping arm 10 is located above the clamping plane E. It is to be noted that even after the final clamping stroke (i.e. in a position only slightly lower than that illustrated in FIG. 1) in the actual clamping position of the workpiece the clamping arm 10 is located above the clamping plane E.

In this position shown in FIG. 1 the two balls 8 engage an axial section 9a of the cam groove 9 (cf. FIG. 2). Upon the feeding of pressure fluid via the port 1d to the piston rod-side surface of the piston 2, the piston 2 and, together with it, the clamping arm 10 are thus lowered, the piston 2 being lowered within the housing 1, and undergo a pure axial movement which is used to clamp an inserted workpiece or die tool between the clamping arm 1 and the table or clamping plane E of the tool machine or press machine.

As soon as the use of the workpiece, machining of or other operation on the workpiece is completed, the piston 2 is raised by feeding pressure fluid against the bottom-side pressure surface. The balls 8 thereby engage the upper end of the axial sections 9a of the cam groove 9 and, upon further axial displacement of the piston 2 in upward direction, at the same time by their guidance in the helical groove sections 9b cause a swinging of the piston 2 and thus of the clamping arm 10 by 90°. At the end of the groove sections 9b the balls 8 engage the additional axial sections 9d which cause pure axial displacement of the piston 2 and thus of the clamping arm 10. The piston 2 thus passes into its intermediate position Z, limited in height by abutment against the housing cover 3, which position is shown in FIGS. 1 and 3.

The piston rod-side surface of the piston 2 is once again applied with the pressure fluid via the port 1d. Upon the resulting downward axial movement of the piston 2 in a direction towards the stop pin 13b, the balls 8 by-pass the opening to the groove sections 9b moving in the additional axial section 9d moving to the end of the additional sections 9d, before arriving in the helical groove sections 9c. These additional sections 9c turn the piston 2 and thus the clamping arm 10 by a further 90° in the same direction as before so that the clamping arm 10 assumes a position which is swung 180° with respect to the clamping position S, as shown by FIGS. 1 and 3. In this swung position now the piston 2 is lowered by pure axial movement until the clamping arm 10 has reached its position of rest R, located below the clamping plane E, which rest position R is limited by abutment of the piston 2 against the bottom 1e of the housing 1. In the rest position R of the clamping arm 10, workpieces can be displaced even laterally in the clamping plane E without interference from the swing clamp since the clamping arm is retracted in the machine or press tool (not shown) under the clamping plane E.

As soon as a workpiece is inserted, the bottom surface of the piston 2 is again applied with pressure fluid. Accordingly, the piston 2 carries out a pure axial movement since it is guided by the balls 8 in the axial sections 9a of the cam groove 9. This linear guidance and the momentum inherent in the purely axial movement enable the groove sections 9c which open into the upper region of the axial sections 9a to be by-passed. Thus the balls 8 pass, into and via the helical groove sections 9b (where they effect a swinging of the clamping arm 10 in the same direction as before by an additional 90°) into the axially extending additional sections 9d so that the clamping arm 10 passes into a further intermediate position Z, which is 90° apart from the rest position R. It is to be noted that the workpiece has an opening, or an adaptor fastened to the workpiece has an opening, complementary and aligned with an opening in the bed (or mounting plate) of the machine tool or press, which openings are at smallest complementary and aligned with the position and cross-sectional shape of the clamping arm in the rest position so that the clamping arm can pass through these openings during movement in the axial sections 9a, from the rest position R, to above the workpiece (as well as to the rest position R to below the clamping plane E). The clamping arm 10 is then to be brought, by subsequent application of pressure on the piston rod-side piston surface, into the clamping position S. In this respect the balls 8, due to their guidance in the axially extending additional sections 9d, first by-pass the opening of the helical groove sections 9b to move into the lower portion of the additional sections 9d and enter in positive fashion into the helical groove sections 9c. These groove sections 9c effect a swinging of the clamping arm 10 in the same direction as before by an additional 90° into the clamping position S. In this clamping position S, the balls 8 which engage into the axial sections 9a of the cam groove 9 assure a pure axial movement of the piston 2 and thus of the clamping arm 10. As may be noted the swing clamp rotates during the lifting and lowering movement in the helical groove sections always in the same direction, in the embodiment disclosed herein counter-clockwise.

Figure 4:
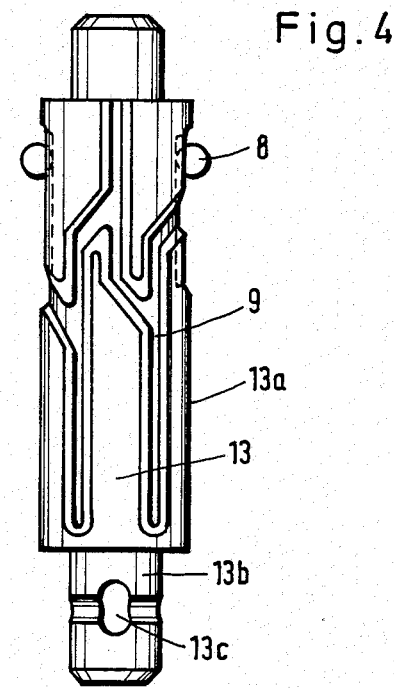
FIG. 4 is a side view of a control bolt thereof with a double-sided clamping arm.
Figure 5:
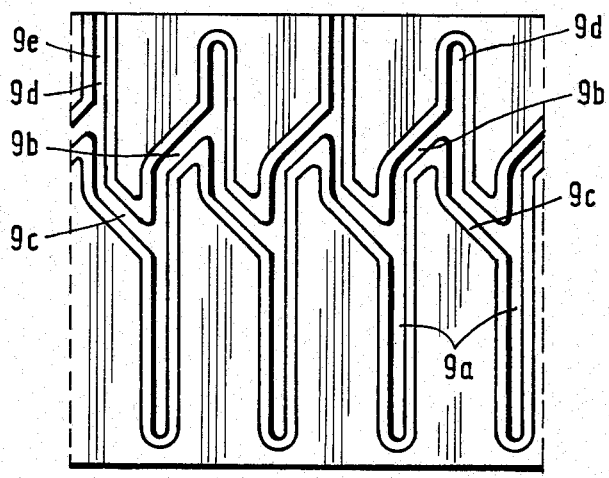
FIG. 5 is a development of the cylindrical surface of the control bolt of FIG. 4.

In the second embodiment shown in FIGS. 4 and 5, the clamping arm 10 is developed as a double-sided clamping arm. It thus extends towards opposite sides from the piston rod 2a and can simultaneously clamp two workpieces or one workpiece at two places. In this case, as can best be noted from FIGS. 4 and 5, a total of four cam grooves 9 are formed in the wall surface 13a of the control bolt 13. The cam grooves 9 each have axial sections 9a which extend parallel to each other at the lower end and are uniformly distributed over the periphery of the control bolt 13, the axial sections 9a producing a linear movement of the piston 2 and thus of the clamping arm 10. Adjoining the upper end of the axial sections 9a, which are 90° apart from each other in the circumferential direction, are helical groove sections 9b and 9c which, in addition to causing an axial movement of the piston 2, simultaneously produce a turning movement. This turning movement takes place, in the embodiment shown in FIGS. 4 and 5, over a region of 45° and results in a corresponding swinging movement of the double-sided clamping arm. While the helical groove sections 9b, at the start of the stroke, effect a swinging of the clamping arm upon the outward travel of the piston 2, the helical groove sections 9c effect the swinging of the clamping arm 10 upon the inward travel of the piston 2.

Adjoining the upper ends of the helical groove sections 9b and 9c, which are arranged away from the axial sections 9a, are linearly and axially extending additional sections 9d which serve to accurately locate and determine the position of the clamping arm 10 in its intermediate position Z. This intermediate position Z, in the second embodiment, lies between the clamping position S and the rest position R, the latter which is 90° apart from the clamping position S. Thus in this embodiment the intermediate position Z differs both from the clamping position S and from the rest position R by a turn of 45°.

Upon consideration of FIG. 1 it is apparent that the transverse forces exerted by the balls 8 on the control bolt 13 and the piston 2 counteract each other upon the positive control of the piston 2 since the balls 8 are diametrically opposite each other.

In order to facilitate the assembly of the above-described swing clamp and in particular to permit the insertion of the piston 2 provided with the balls 8 into the housing 1 when the control bolt 13 is already mounted, two of the additional sections 9d are extended in the axial direction by runner sections 9e which are open at their upper ends. In this way it is possible to introduce the balls 8 from above into the cam grooves 9 via these open ends.

Figure 6:
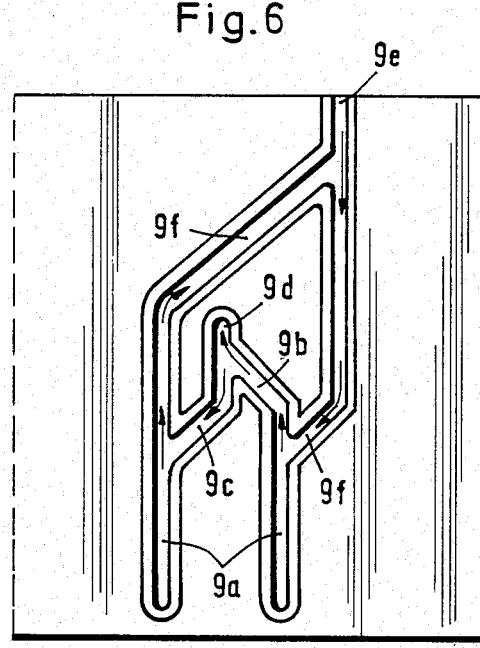
FIGS. 6 and 7 are similar views of central cams for two further embodiments of the invention.

FIG. 6 shows another embodiment of the invention based on a modification of the cam groove 9. In this embodiment an additional section 9d for the intermediate position Z lies between two axial sections 9a and is connected with them via groove sections 9b and 9c. The cam groove is, however, closed on itself—except for the runner section 9e for the introduction of the balls 8—by upper completion sections 9f.

Figure 7:
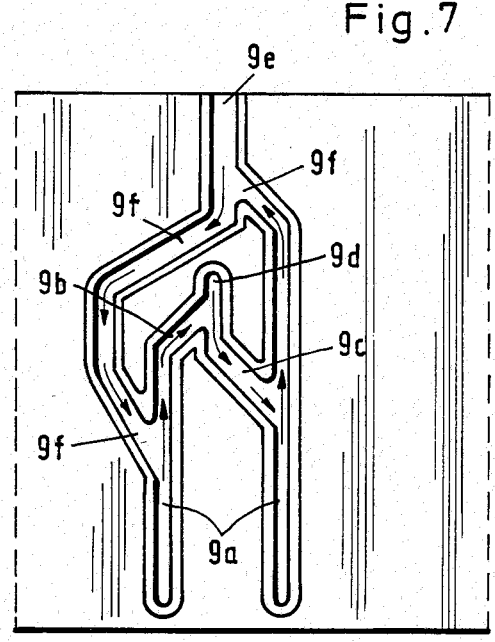

In the embodiment of FIG. 7 there is also a closed formation of the cam groove which differs from the construction of FIG. 6 only by the position of the completion sections 9f.

Herein the word workpiece means any member to be clamped, including but not limited to workpieces to be machined or worked on and die tool halves.

I claim:

1. In a hydraulically actuatable swing clamp, particularly for the clamping of objects such as workpieces, tools and fixtures on a machine, having a single piston which is arranged in a housing, the piston having a piston rod which extends in sealed manner out of the housing, carries a clamping arm for clamping the object at a clamping position and carrying out, in addition to an axial clamping movement, a rotary movement corresponding to a guide device, the rotary movement effecting a swinging of the clamping arm, the guide device including a control bolt normally non-rotatable with respect to the housing and extending into the piston, and at least one cam groove provided in a guide surface between the control bolt and the piston, the cam groove having a helical section for the swinging and simultaneous stroke movement of the clamping arm and an axial section for pure clamping movement of the clamping arm, and guide means arranged on the piston or control bolt for engaging the cam groove, the improvement wherein said cam groove constitutes means for swinging said clamping arm to and from an intermediate position above a clamping plane, said intermediate position being rotated by a predetermined angle relative to said clamping position, and to and from a rest position below said clamping plane, said rest position being rotated relative to said clamping position by a second angle, said second angle is twice said predetermined angle, and said clamping arm is above said clamping plane in said clamping position and lifted further above said clamping plane in said intermediate position.

2. The swing clamp according to claim 1, wherein said guide means comprise at least two members arranged diametrically opposite each other between the control bolt and the piston.

3. The swing clamp according to claim 2, wherein said members are balls.

4. The swing clamp according to claim 1, wherein said second angle and said predetermined angle have the same direction of rotation with respect to said clamping position.

5. In a hydraulically actuatable swing clamp, particularly for the clamping of objects such as workpieces, tools and fixtures on a machine, having a piston which is arranged in a housing, the piston having a piston rod which extends in sealed manner out of the housing, carries a clamping arm for clamping the object at a clamping position and carrying out, in addition to an axial clamping movement, a rotary movement corresponding to a guide device, the rotary movement effecting a swinging of the clamping arm, the guide device including a control bolt normally non-rotatable with respect to the housing and extending into the piston, and at least one cam groove provided in a guide surface between the control bolt and the piston, the cam groove having a helical section for the swinging and simultaneous stroke movement of the clamping arm and an axial section for pure clamping movement of the clamping arm, and guide means arranged on the piston or control bolt for engaging the cam groove, the improvement wherein said cam groove constitutes means for swinging said clamping arm to and from an intermediate position above a clamping plane, said intermediate position being rotated by a predetermined angle relative to said clamping position, and to and from a rest position below said clamping plane, said rest position being rotated relative to said clamping position by a second angle, said second angle is twice said predetermined angle, said cam groove includes at least, two first axial sections with which said guide means is engaged when said clamping arm is in and for effecting said clamping position and said rest position, respectively, two second axial sections with which said guide means is engaged when said clamping arm is in and for effecting said intermediate position, said two second axial sections are disposed above and alternately between said first axial sections, respectively, helical sections communicating each of said second axial sections with both of said first axial sections adjacent thereto, in the manner that an upper end of said first axial sections communicates with a central region of respective adjacent of said second axial sections via a first of said helicaal sections and a lower end of said respective second axial sections communicates with an upper region of the other adjacent said first axial section, respectively, via a second of said helical sections.

6. The swing clamp according to claim 5, wherein said clamping arm is a one-side clamping arm, said first axial sections are peripherally offset 180° with respect to each other, and said second axial sections are peripherally offset 90° with respect to said first axial sections.

7. The swing clamp according to claim 5, wherein said clamping arm is a two-side clamping arm, four of said first axial sections are peripherally offset 90° with respect to each other, and said second axial sections respectively are disposed between said first axial sections and are peripherally offset 45° with respect to said first axial sections.

8. The swing clamp according to claim 5, further comprising four of said first axial sections offset by 90° from each other in the circumferential direction, and four of said second axial sections offset by 90° from each other and respectively offset from adjacent of said first axial sections by 45°.

9. The swing clamp according to claim 5, wherein said cam groove including first and second axial sections and said helical sections are connected into a closed loop 360° around said guide surface.

10. In a hydraulically actuatable swing clamp, particularly for the clamping of objects such as workpieces, tools and fixtures on a machine, having a piston which is arranged in a housing, the piston having a piston rod which extends in sealed manner out of the housing, carries a clamping arm for clamping the object at a clamping position and carrying out, in addition to an axial clamping movement, a rotary movement corresponding to a guide device, the rotary movement effecting a swinging of the clamping arm, the guide device including a control bolt normally non-rotatable with respect to the housing and extending into the piston, and at least one cam groove provided in a guide surface between the control bolt and the piston, the cam groove having a helical section for the swinging and simultaneous stroke movement of the clamping arm and an axial section for pure clamping movement of the clamping arm, and guide means arranged on the piston or control bolt for engaging the cam groove, the improvement wherein said cam groove constitutes means for swinging said clamping arm to and from an intermediate position above a clamping plane, said intermediate position being rotated by a predetermined angle relative to said clamping position, and to and from a rest position below said clamping plane, said rest position being rotated relative to said clamping position by a second angle, said cam groove includes, a first axial section, a first helical section communicating with said first axial section, a second axial section communicating with said first helical section, a second helical section communicating with said second axial section, a third axial section corresponding to said first axial section, said third axial section communicates with said second helical section, said second axial section is offset by said predetermined angle relative to said first axial section, a closed loop portion connecting said first and third axial sections, said closed loop portion by-passes said second axial section such that said guide means sequentially moves from the clamping position in one of said first and third axial sections to the intermediate position in the second axial section, and to the rest position in the other of said first and third axial sections, and then by-passes the intermediate position around the closed loop portion in moving from the rest position to the clamping position, and an extra axial section communicating with said closed loop portion.

11. The swing clamp according to claim 10, wherein said clamping position corresponds to said third axial section and said rest position corresponds to said first axial section and said guide means sequentially engages said third axial section, said second axial section and said first axial section, and said closed loop portion is arranged such that said guide means does not engage said closed loop portion during the sequential engagement of the guide means with said third, second and first axial sections, said guide means then sequentially engaging said third axial section via said closed loop portion from said first axial section to bypass the second axial section.

12. The swing clamp according to claim 10, wherein said clamping position corresponds to said first axial section and said rest position corresponds to said third axial section and said guide means sequentially engages said first axial section, said second axial section and said third axial section and said closed loop portion is arranged such that said guide means does not engage said closed loop portion during the sequential engagement of the guide means with said first, second and third axial sections, and said guide means further sequentially engages said first and axial section via said closed loop portion from said third axial section to bypass said second axial section.

13. The swing clamp according to claim 10, wherein said closed loop portion constitutes means for rotating said piston and said clamping arm via said guide means in a direction of rotation counter to the direction of rotation of said piston when rotating from said clamping position to said intermediate position to said rest position.

14. In a hydraulically actuatable swing clamp, particularly for the clamping of objects such as workpieces, tools and fixtures on a machine, having a single piston which is arranged in a housing, the piston having a piston rod which extends in sealed manner out of the housing, carries a clamping arm for clamping the object at a clamping position and carrying out, in addition to an axial clamping movement, a rotary movement corresponding to a guide device, the rotary movement effecting a swinging of the clamping arm, the guide device including a control bolt normally non-rotatable with respect to the housing and extending into the piston, and at least one cam groove provided in a guide surface between the control bolt and the piston, the cam groove having a helical section for the swinging and simultaneous stroke movement of the clamping arm and an axial section for pure clamping movement of the clamping arm, and guide means arranged on the piston or control bolt for engaging the cam groove, the improvement wherein said cam groove constitutes means for swinging said clamping arm to and from an intermediate position above a clamping plane, said intermediate position being rotated by a predetermined angle relative to said clamping position, and to and from a rest position below said clamping plane, said rest position being rotated relative to said clamping position by a second angle.

* * * * *